United States Patent [19]
Yamada et al.

[11] 3,868,704
[45] Feb. 25, 1975

[54] CONTROL SYSTEM FOR A SINGLE LENS REFLEX CAMERA

[75] Inventors: Seiji Yamada; Kotaro Yata, both of Osaka, Japan

[73] Assignee: Minolta Camera Kabushiki Kaisha, Osaka-shi, Osaka-fu, Japan

[22] Filed: Aug. 28, 1972

[21] Appl. No.: 284,105

[30] Foreign Application Priority Data
Aug. 27, 1971 Japan.................................. 46-65175

[52] U.S. Cl....................... 354/50, 354/51, 354/60, 354/258
[51] Int. Cl............................ G03b 9/12, G03b 7/08
[58] Field of Search...... 95/10 CT, 53 EA; 307/293; 354/50, 60, 258

[56] References Cited
UNITED STATES PATENTS

| | | | |
|---|---|---|---|
| 3,348,462 | 10/1967 | Fahlenberg........................ | 95/53 EA |
| 3,603,799 | 9/1971 | Nobusawa......................... | 95/10 CT |
| 3,646,371 | 2/1972 | Flad.................................... | 307/293 |
| 3,657,979 | 4/1972 | Nobusawa......................... | 95/10 CT |
| 3,703,130 | 11/1972 | Watanabe.......................... | 95/10 CT |
| 3,727,526 | 4/1973 | Hinds................................. | 95/10 CT |
| 3,748,979 | 7/1973 | Wada................................. | 95/10 CT |

FOREIGN PATENTS OR APPLICATIONS
45-4903 2/1970 Japan................................ 95/10 CT

*Primary Examiner*—Samuel S. Matthews
*Assistant Examiner*—Russell E. Adams, Jr.
*Attorney, Agent, or Firm*—Watson, Cole, Grindle & Watson

[57] ABSTRACT

Digital data relating to the scene illumination is stored in a storage circuit and optionally together with digital film sensitivity and/or diaphragm aperture data. The data storing is performed by counting pulses supplied from a time base unit through a control circuit, which is selectively connected, depending on the film sensitivity and/or the diaphragm aperture data, to a first output terminal of the time base unit generating a basic pulse frequency and submultiple pulse frequencies thereof, and which has a gate circuit responsive to a light detecting circuit including a photosensitive element. Another series of pulses from a second output terminal of the time base unit selected in accordance with the exposure multiple are counted by a pulse counter up to a number corresponding to the number of pulses in the storage circuit to generate a signal for releasing the shutter.

5 Claims, 6 Drawing Figures

CONTROL SYSTEM FOR A SINGLE LENS REFLEX CAMERA

BACKGROUND OF INVENTION

The present invention relates to an exposure control system for a single lens reflex camera wherein the scene illumination data together with the film sensitivity and-/or the diaphragm aperture data, if necessary, is stored and whereby the exposure time is controlled in accordance with the content of the stored data.

A single lens reflex camera is not capable of detecting the scene illumination during the exposure period. It has been the practice therefore to measure the scene illumination and store the data representative thereof in advance of the exposure and to control the exposure period in response to the stored data. A conventional exposure control system employed for this purpose has a capacitor adapted to store the scene illumination-representing voltage in the form of an analog quantity. However, the voltage source used in combination with the capacitor is actually limited in its voltage to a value in the range of a few volts. It is difficult to cover a wide range of variations in the scene illumination with such a limited voltage range. Moreover, the analog signal circuit includes semiconductor devices for the conversion of the stored analog voltage to an exposure control output signal which tends to be affected by temperature and/or voltage variations. A compensation circuit is needed for avoiding such adverse effects. However, sufficient compensation cannot be expected even with the use of such a compensation circuit. For these reasons, the conventional exposure control system has not attained high accuracy.

In contrast to the analog type control system, a known digital type control system has flip-flop circuits for the storage of a digital quantity and a variable frequency pulse oscillator for generating pulses at a repetition frequency dependent on the scene illumination. The number of pulses generated by the pulse oscillator in a predetermined period of time is counted and stored to achieve the storage of scene illumination data in digital form. This control system also has a technical disadvantage in that the repetition frequency of the pulses must be varied in linear proportion to the very broad range of variation in the scene illumination.

A modification for such a digital type system is possible wherein the pulses generated at a fixed repetition frequency are allowed to pass through a gate circuit for the digital storage for a period of time dependent on the scene illumination. However, with such a modification the exposure control cannot be achieved without feeding the data relating to the film sensitivity and/or the diaphragm aperture into the control system. Display of the actual exposure time is also desired.

Furthermore, a camera must not only provide automatic exposure control but also manual exposure control.

THE OBJECT OF INVENTION

An object of this invention is to provide an exposure control system for a single reflex camera, which is capable of accurately storing data in digital form of the scene illumination together with the film sensitivity and/or the diaphragm aperture data in digital form, if necessary, and setting an adequate exposure time in response to the stored data.

Another object of the invention is to provide an exposure control system of the type specified having improved exposure control accuracy and enabling the operator to alter the exposure period by means of a simple switching mechanism.

And yet another object of the invention is to provide an exposure control system of the type specified wherein the actual exposure time is digitally displayed.

Still another object of this invention is to provide an exposure control system for a single lens reflex camera for providing not only automatic exposure control but also manual setting of the exposure time using digital storage and pulse counting techniques.

SUMMARY OF INVENTION

According to the present invention, there is provided an exposure control system for a single lens reflex camera wherein the measured scene illuminated data is stored in a storage circuit in digital form together with a digital representation of the film sensitivity and/or the diaphragm aperture data, if necessary. The data storage is performed in the storage circuit by counting counter pulses supplied from a time base unit through a control circuit selectively connected, and in selective dependence on the film sensitivity and/or the diaphragm aperture data, to a first output terminal of the time base unit generating the counter pulses at submultiple frequencies of a basic frequency. The control circuit has a gate circuit responsive to a light detecting circuit including a photosensitive element. Another series of counter pulses from a second output terminal of the time base unit, selected in accordance with a desired exposure multiple, are counted by a pulse counter up to a number corresponding to the content of the storage circuit. Upon detection of the coincidence between the number of stored pulses and the counted pulses a shutter-closing signal is generated to terminate the exposure.

DETAILED DESCRIPTION OF INVENTION

Figure 1:
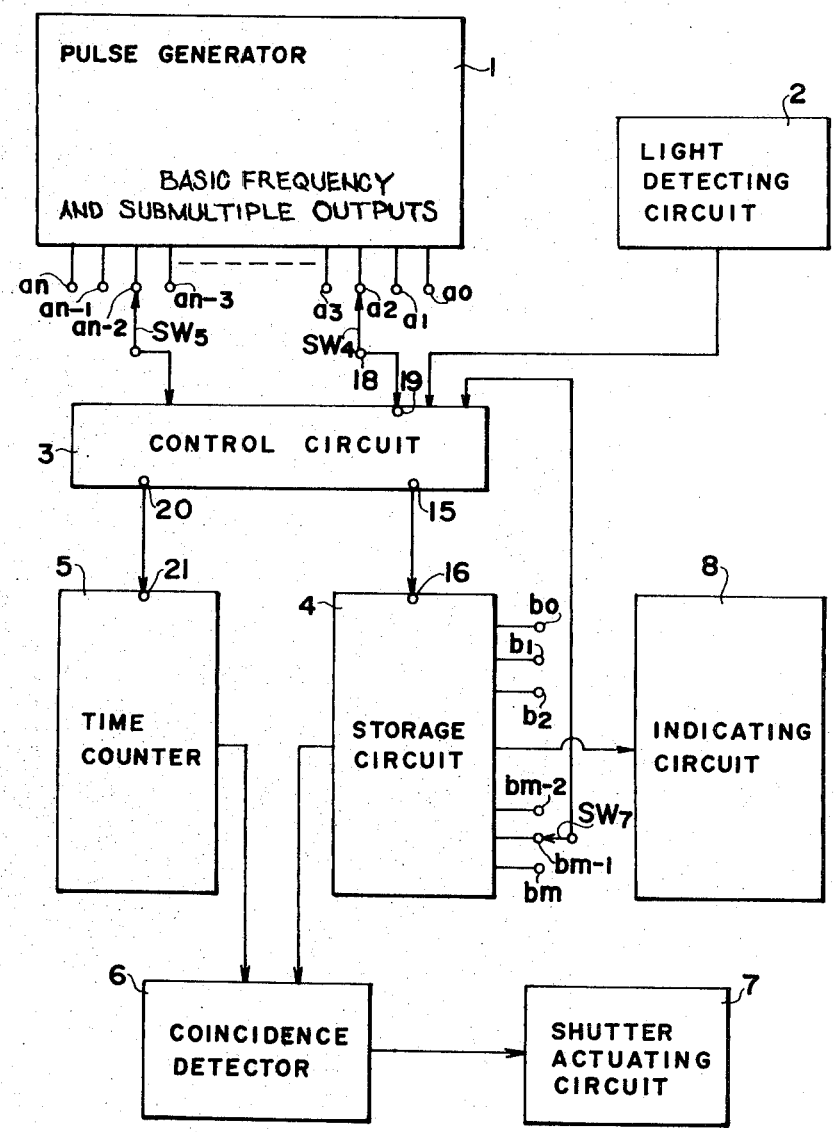
FIG. 1 shows a block diagram of an embodiment of this invention.

In FIG. 1, block 1 denotes a time base unit, i.e., a pulse generator having a pulse oscillator operating at a predetermined repetition frequency and a number of frequency divider circuits, for providing at terminals $a_0$, $a_1, a_2, \ldots a_i, \ldots a_{n-1}$, and $a_n$ trains of frequency-divided pulses. Assuming that the predetermined repetition frequency of the pulse oscillator is $f_0$Hz, the output pulse at terminal $a_i$ is $(\frac{1}{2})^i f_0$Hz.

Figure 2:
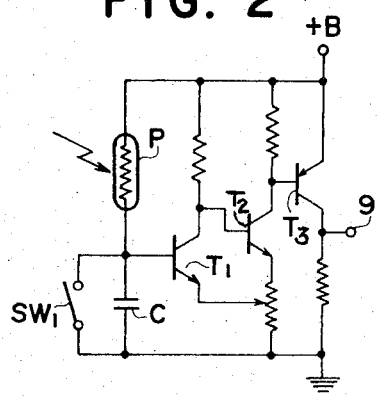
FIG. 2 shows a circuit diagram of the light detecting circuit employed in the invention.

Block 2 denotes a light detecting circuit which has, as shown in FIG. 2, a time constant circuit composed of capacitor C and, for example, a CdS photoconductive element P connected in series. Switch SW1 is connected across capacitor C and is opened by the shutter release button or the like (not shown) in immediate advance of the release of the shutter. The junction between photoconductive element P and capacitor C is connected to the base of transistor T1. Transistors T2 and T3 are coupled with transistor T1 to form a Schmitt circuit. Thus, a level-inverted output pulse is obtained at an output terminal 9 coupled to transistor T3. The voltage level at output terminal 9, which remains high immediately after the opening of switch SW1, is lowered as capacitor C is charged up to a preset voltage. The high and low voltage levels at the above-mentioned junction are designated by "1" and "0," respectively. The level-inverted output at terminal 9 serves as a gating signal representative of the scene illumination.

Block 3 denotes a control circuit operated by the above-mentioned shutter release button or like mechanism. Under the automatically-controlled-exposure-time mode of operation, control circuit 3 controls, in response to the gating signal supplied from terminal 9 of light detecting circuit 2, the time period in which the counter pulses are supplied from a first terminal, selected from the terminals $a_0 - a_n$ of the time base unit 1, to a storage circuit 4 through switch SW4. The selection of the terminals $a_0 - a_n$ is carried out by switch SW4 in conjunction with the manual setting of one or both the film sensitivity and the diaphragm aperture. At the same time, control circuit 3 initiates the transfer to pulse counter 5 of pulses from a second terminal, which is selected from terminals $a_0 - a_n$ of the time base unit 1 by switch SW5 operated by the depression of the shutter release button.

In the manual operation mode, the control signal from light detecting circuit 2 is prevented from undergoing a level inversion. In that mode, the counting of pulses supplied at the first terminal selected by the switch SW5 from terminals $a_0 - a_n$ of the time base 1 is continued until a counter-stopping pulse is supplied through one of counter-stopping pulse output terminals $b_0 - b_m$ of the storage circuit 4 selected by switch SW7 linked with the manual setting of the exposure time. Further, the pulse transfer to pulse counter 5 is started for those pulses appearing at the second terminal selected by the switch SW5 from terminals $a_0 - a_n$ of the time base unit 1.

Storage circuit 4 and pulse time counter 5 are essentially made of conventional binary counters having flip-flop circuits. More specifically, storage circuit 4 memorizes a digital quantity representative of the scene illumination and has counter-stopping pulse output terminals $b_0 - b_m$, one of which is selected by switch SW7 to permit the counterstopping pulse to be supplied to a gate circuit included in control circuit 3. Pulse counter 5 counts the pulses supplied from a terminal 20, which pulses are selected from one of terminals $a_n$, $a_{n-1} \ldots a_{n-i}$ by switch SW5, linked with the release of the shutter so that the time interval may be measured between the start of the pulse counting and the detection of the coincidence between the number of the pulses counted and the number stored in storage circuit 4. The time interval measured in this way corresponds to the exposure time.

A coincidence detector 6 is provided, which is essentially composed of AND circuits, for determining the aforementioned number coincidence. Upon detection of the coincidence, detector 6 supplies an output pulse to shutter actuating circuit 7 to close the released shutter. In the case of a curtain-type shutter, for example, the electromagnet provided for preventing movement of the trailing screen of the shutter may be cut off to permit the trailing screen to be driven.

Block 8 denotes an indicator circuit for providing a digital display of the exposure time in response to the contents of storage circuit 4. Indicator circuit 8 may include indicating means such as light-emitting diodes and indicator lamps.

Figure 3:
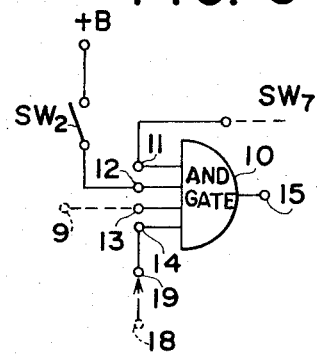
FIG. 3 schematically shows a portion of the control circuit employed in the invention.
Figure 5:
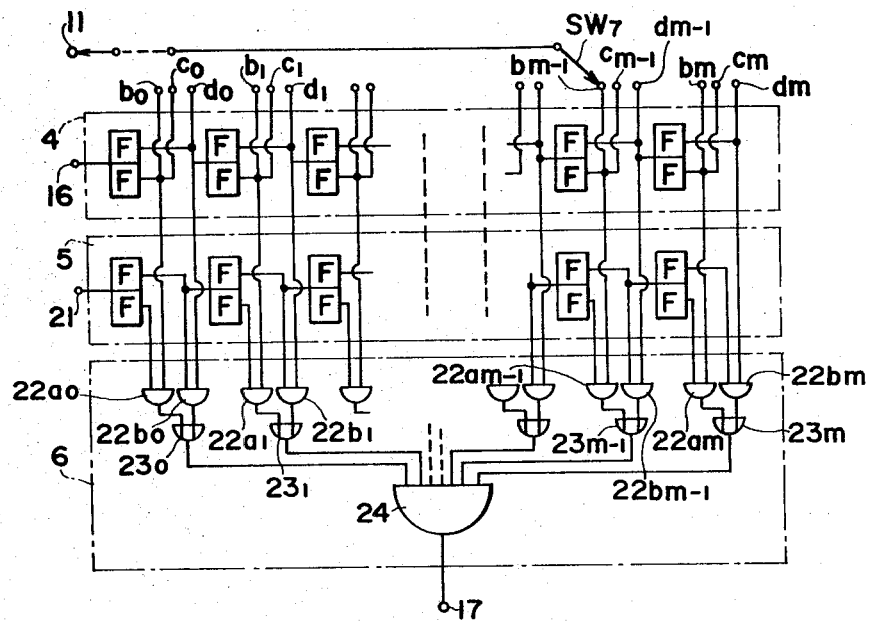
FIG. 5 schematically shows a circuit diagram of the storage circuit, the pulse counter, and the coincidence detector employed in the invention.

FIG. 3 shows AND circuit 10 constituting a part of the control circuit 3, and input terminal 11 of AND circuit 10 is connected to one of the counter-stopping pulse output terminals $b_0 - b_m$ of storage circuit 4 through switch SW7. Terminals $b_0 - b_m$ are connected respectively to the $m + 1$ stages of flip-flop circuits constituting storage circuit 4 as shown in FIG. 5. Each flip-flop circuit of storage circuit 4 provides a binary digit 1 in the normal state and a 0 in the set or reversed state. When supplied through switch SW7 to the input terminal 11 of AND circuit 10, the output prevents gate 10 from opening.

Another input terminal 12 of AND circuit 10 is connected to high-level voltage B source through switch SW2 which is closed upon the opening of switch SW1. It follows therefore that the closing of switch SW2 conditions AND circuit 10 to open. Still another input terminal 13 of AND circuit 10 is connected to output terminal 9 of light detecting circuit 2. Since the output voltage at terminal 9 depends on the charge of capacitor C of light detecting circuit 2 as described above, the incoming pulse signal at terminal 13 is 1 until the voltage across the capacitor C reaches a preset value and it turns to 0 once that preset value is reached. As is apparent, the input 1 conditions AND circuit 10 to open, while 0 prevents it from opening.

The other input terminal 14 of AND circuit 10 is connected through terminals 18 and 19 to switch SW4 which selects one of the output terminals $a_0 - a_n$ of the time base unit 1. With the input signals at the input terminals 11, 12, and 13 at 1, the time base unit output pulse incoming at the input terminal 14 is allowed to pass through AND circuit 10 and transferred through its output terminal 15 to storage circuit 4.

Figure 4:
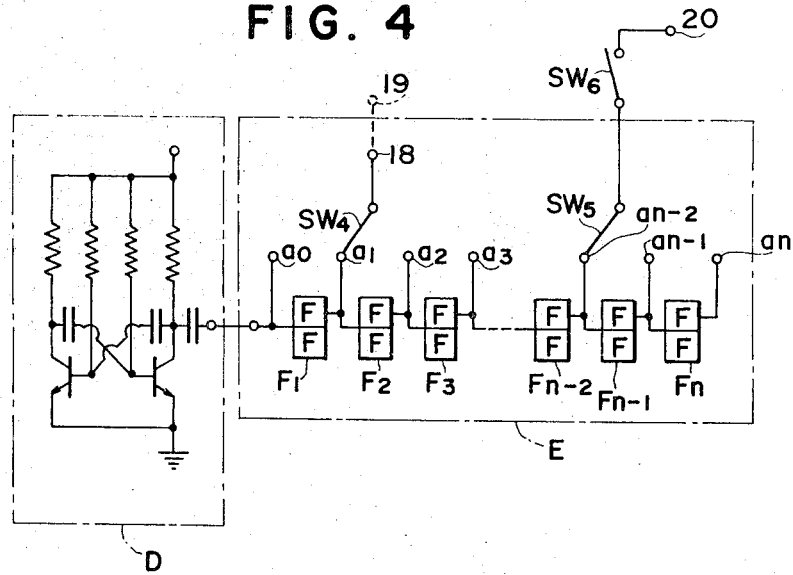
FIG. 4 schematically shows a circuit diagram of the time base unit employed in the invention.

As shown in FIG. 4, time base unit 1 is composed of pulse oscillator D for generating pulses at a predetermined repetition frequency and frequency divider E having a binary counter including flip-flop circuits. Terminal $a_0$ is connected directly to the output of oscillator D, while terminal $a_1$ is coupled to the first-stage flip-flop circuit $F_1$ and terminal $a_2$ to the second-stage flip-flop circuit $F_2$. Likewise, the terminal $a_n$ is connected to the n-th stage flip-flop circuit Fn.

It will be apparent therefore that, for the repetition frequency $f_0$Hz of pulse oscillator D, the output at terminal $a_i$ has a frequency of $(\frac{1}{2})^i f_0$Hz. Thus, the repetition frequencies of the output pulse trains at terminals $a_0, a_1, a_2, \ldots,$ and $a_n$ are $f_0, (\frac{1}{2})f_0, (\frac{1}{4})f_0, \ldots,$ and $(\frac{1}{2})^n f_0$Hz, respectively. Each of the $nSW4$ and $SW5$ is arranged to select one of these terminals arbitrarily.

Switch SW6, which is connected in series with switch SW5, is closed in linkage with the opening of the leading screen, in the case of a curtain shutter. Therefore, the closing of switch SW6 results in the transfer of those pulses selected by switch SW5 to pulse counter 5 through terminals 20 and 21 from the output terminal of the time base unit 1. Moreover, switch SW4 selects one of the terminals $a_0 - a_n$ depending on the film sensitivity and/or the diaphragm aperture and the selected terminal is connected through terminals 18 and 19 to the input terminal 14 of AND circuit 10 of control circuit 3.

Switch SW5 is linked with a dial member not shown, which permits manual setting. A graduation for $x$ ¼, $x$ ½, $x$ 1, $x$ 2, $x$ 4 is placed on the dial member to indicate the exposure multiples. The graduation is for the adjustment with other indexes given on the body of the camera. The multiple $x$ 1 is suited for ordinary lighting conditions. When the multiple $x$ 2 is selected, the actual exposure is twice as large as the adequate exposure.

Referring to FIG. 5, which shows the details of storage circuit 4, pulse counter 5, and coincidence detector 6, the storage circuit 4 is enclosed by a dot-dash line and has input terminal 16 connected to output terminal 15 of AND circuit 10 shown in FIG. 3. As is apparent from the drawing, storage circuit 4 starts counting when supplied with pulses through AND circuit 10. Storage circuit 4 has $m+1$ flip-flop circuits connected in series, with the respective output terminals initially in the 1 state and connected respectively to the counter-stopping pulse output terminals $b_0 - b_m$. Switch SW7 selects one terminal $b_i$ out of terminals $b_0 - b_m$ to supply the pulses to the above-mentioned input terminal 11 of AND circuit 10.

As is apparent, the application of $2^i$ pulses through the input terminal 16 to storage circuit 4 causes the counterstopping pulse at the terminal $b_i$ to be turned from 1 to 0. Assuming that terminal $b_i$ is selected by switch SW7, the introduction to storage circuit 4 of the $2^i$ pulses results in a 0 input at terminal 11 of AND circuit 10, closing AND circuit 10 and thereby stopping the pulse counting of storage circuit 4.

Pulse counter circuit 5 for measuring the above-mentioned time interval has $m+1$ flip-flop circuits connected in series. The pulses supplied through input terminal 21 from terminal 20 of control circuit 3 are counted by counter circuit 5.

Upon detection of the coincidence in the pulse counting between storage circuit 4 and counter circuit 5, coincidence detector 6 provides a pulse at output terminal 17 to release the locked state of the shutter. To ensure this operation, those respective output terminals of the flip-flop circuits of storage circuit 4, which are coupled to the counter-stopping pulse output terminals $b_0 - b_n$, and the respective ones of the output terminals of the flip-flop circuits of counter circuit 5 are connected respectively to AND circuits $22_{ao}$ to $22_{am}$. There are m+1 number of AND circuits $22_{ao}$ to $22_{am}$. Likewise, those output terminals $d_o - d_m$ of flip-flop circuits of storage circuit 4, which are not connected to the counter-stopping pulse output terminals $b_0 - b_m$, and those output terminals of the flip-flop circuits of counter circuit 5 which are not coupled to the AND circuits $22_{ao} - 22_{an}$ are connected respectively to another series of AND circuits $22_{bo} - 22_{bm}$, which are also m+1 in number. The outputs of the pairs of AND circuits $22_{ao}$, $22_{bo}$; $22_{al}$, $22_{bl}$; . . . ; $22_{am}$, $22_{bm}$ are coupled respectively to the input terminals of OR circuits $23_o$, $23_1$ . . . , $23_m$, which are also m+1 in number. The outputs of the OR circuits $23_o - 23_m$ are supplied to AND circuit 24 having output terminal 17.

Figure 6:
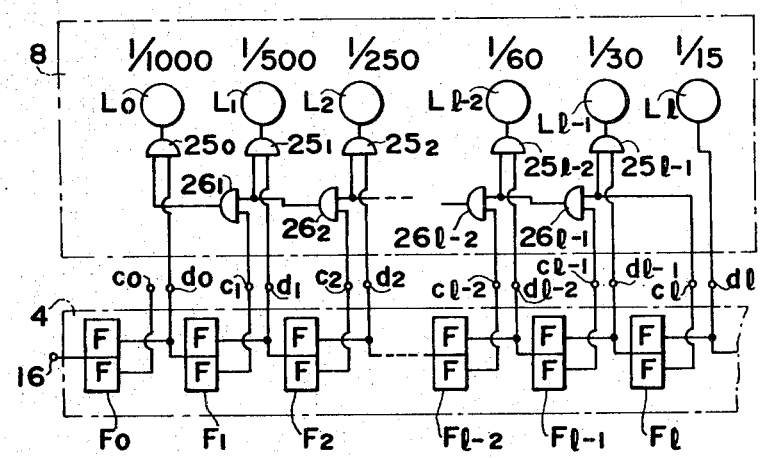
FIG. 6 is a circuit diagram showing the connection between the memory circuit and the indicator circuit.

With respect to FIG. 6, terminals $c_o - c_l$ respectively correspond to output terminals $c_o - c_m$ of FIG. 5, and terminals $d_o - d_l$ respectively correspond to output terminals $d_o - d_m$ of FIG. 5 and provide input signals for actuating indicator curcuit 8 for indicating the shutter speed. As shown in FIG. 6, indicator circuit 8 comprises AND circuits $25_o$ to $25_{l-1}$, the outputs of which are respectively connected to indicator tubes or light emitting diodes $L_o - L_l$, and the inputs of which are respectively coupled to the terminals $c_1 - c_l$ and $d_1 - d_l$, with the exception of AND circuit $25_o$ having its inputs connected to terminal $d_o$ and the output of AND circuit $26_1$. AND circuits $26_1 - 26_{l-2}$ have inputs connected respectively to the outputs of AND circuits $26_2 - 26_{l-1}$ and terminals $C_1 - C_{l-2}$. The inputs of AND circuit $26_{l-1}$ are respectively coupled to terminals $c_l$ and $c_{l-1}$. The number $(l+1)$ of the indicating means $L_o - L_l$ need not, but may, be equal to the number $(m+1)$ of the flip-flop stage in storage circuit 4.

The operation of the automatic exposure time control system is as follows. Depending on the film sensitivity and/or the diaphragm aperture information, switch SW4 is set to select one of terminals $a_o - a_n$. Thus, the number of pulses stored in storage circuit 4 depends on the scene illumination, the film sensitivity and/or the aperture of the diaphragm. Circuit constants are determined so as to make the time for the light value measured by light detecting circuit 2 equal to a fraction, e.g., one fourth, of the adequate exposure time determined by the scene illumination, the film sensitivity and/or the diaphragm aperture information. Time base unit 1 provides at terminal $a_o$ a pulse train at a repetition frequency of 64 kHz, for example. Assuming that terminal $a_3$ is selected by switch SW4, a pulse train having a repetition frequency of 8 kHz is supplied through terminal $a_3$ to input terminal 14 of AND circuit 10. It is also assumed for this explanation that switch SW5 is set to select terminal $a_5$ having an exposure multiple $x1$. This permits an output pulse train of 2 kHz to be supplied through terminal $a_5$ and switch $S_6$ to counter circuit 5. For this example, switch SW7 is set to select a counter-stopping pulse output terminal $b_i$ providing a counter-stopping pulse output which is well beyond the possible advancement of the pulse count in storage circuit 4.

Immediately after switches SW1 and SW2 are simultaneously opened and closed, respectively, by the release of the shutter, the selected pulse train is supplied from time base unit 1 to storage circuit 4 through terminal $a_3$. After a certain lapse of time, which depends on the scene illumination, the output at terminal 9 of light detecting circuit 2 turns from 1 to 0, closing AND circuit 10. At that time, the pulse counting of storage circuit 4 is stopped and the number of the pulses counted is stored therein.

Assuming that twenty pulses have been counted by storage circuit 4 before the aforementioned change in the output level at terminal 9, the exposure time is equal to 20/2000 or 1/100 sec., which is the time required for counting the twenty pulses at the 2 kHz pulse train rate supplied from the terminal $a_5$ selected by switch SW5. After the pulse counting by storage circuit 4 is finished and with switch SW6 closed by the opening of the leading screen of the shutter, counter circuit 5 starts counting the pulses supplied from time base unit 1 though terminal $a_5$. When the number of the pulses counted reaches 20, the comparator provides an output pulse to cause the trailing screen of the shutter to close. Thus, the exposure is completed. If the diaphragm aperture is smaller by one step than the foregoing example, switch SW4 is set to select terminal $a_2$ to permit forty pulses to be stored by storage circuit 4, so that the exposure time may be 40/2000 or 1/50 sec. If terminal $a_4$ is selected by switch SW5, the exposure time is 1/200 sec., or one-half that provided by switch SW5 set at terminal $a_3$.

As is apparent from the foregoing description, the exposure time can be made twice as long as, or one half of, the adequate exposure time for the same scene illumination by a one-step change between the terminals selected by switches SW4 and SW5, because the pulse trains appearing at terminals $a_o - a_n$ are selected submultiple frequencies of a basic frequency. This allows the control of the exposure time to be achieved by setting switches SW4 and SW5 suitably depending on the film sensitivity and/or the diaphragm aperture settings.

For the manual setting of the exposure time, a linkage is provided between an exposure time indicator dial (not shown) and switch SW7 so that the selection of terminals $b_0 - b_m$ by switch SW7 is related to the exposure time indication. To permit manual setting, switch SW1 is closed together with a switching means for setting the "manual" mode of operation.

With the release of the shutter, switch Sw2 is closed, thereby setting AND circuit 10 to open. Thus, the counter pulses supplied from time base unit 1 through the selected one of terminals $a_o - a_n$ selected by SW4 are allowed to pass therethrough for storage in storage circuit 4, until the flip-flop circuit connected to one of the selected counter-stopping pulse output terminals $b_0 - b_m$ selected by switch SW7 is changed from 1 to 0, which closes AND circuit 10. Thus, the exposure time is suitably set. With switch SW5 set to select a terminal from terminals $a_o - a_n$ corresponding to the exposure multiple $x$ 1, the actual exposure time can be made equal to the desired exposure time manually set in the foregoing manner.

A one-step difference in the selection of the counter-stopping pulse terminal from terminals $b_0 - b_m$ by switch SW7 so as to select a terminal immediately preceding and a terminal immediately following a given terminal changes the exposure time to a value equal to one-half of, and twice as long as, the exposure time for that given terminal, respectively.

Now with respect to the digital indication provided by indicator circuit 8 shown in FIG. 6, output terminals $d_o - d_l$ and $c_o - c_l$ are in 0 and 1 states, respectively, so long as the pulse counting is not in progress by storage circuit 4. The flip-flop circuits of storage circuit 4 are switched upon receipt of input pulses at their respective input terminals, changing from a 0 to a 1 state and vice versa at output terminals $d_o - d_l$ and $c_o - c_l$. Assuming that the pulse counting is finished with third-stage flip-flop circuit $F_2$ of the storage circuit 4 inverted in response to pulses supplied through input terminal 16, flip-flop circuit $F_2$ forms the final stage engaged in the pulse counting. The outputs at terminals $d_2$ and $c_2$ of the flip-flop circuit $F_2$ are 1 and 0, respectively, while the outputs at terminals $c_3 - c_l$ and $d_3 - d_l$ of the third — or higher — stage flip-flop circuits are 1 and 0, respectively. Since the outputs from AND circuits $26_3, 26_4, \ldots 26_{l-1}$ are 1, AND circuit $25_2$ connected to indicating means $L_2$ for the final counter stage $F_2$ receives at its input terminals a 1 from AND gate $26_3$ and another 1 simultaneously from the output terminal $d_2$, thereby turning "on" indicating means $L_2$. Further, the indicating means other than $L_2$ are not turned "on" because one of the inputs at each of AND circuits $25_0, 25_1, 25_3, \ldots$ and $25_{l-1}$ remains in a 0 state.

The foregoing description is applicable regardless of how far the pulse counting of storage circuit 4 has advanced. Thus, the digital indication of the exposure time is achieved. While the digital indication involves an error of 1 EV at its maximum, the exposure time control actually set by the system is free from any such error.

The digital indication of the exposure time given by indicating means $L_o - L_l$ in the foregoing manner can be arranged to correspond to the actual exposure time as follows. The pulse counting is set to be based on the pulses supplied from that terminal among terminals $a_o - a_n$ selected by the switch SW5 which corresponds to the exposure multiple $x$ 1. Then, the indicating means, which is controlled by the output of the flip-flop circuit in storage circuit 4 which corresponds to that flip-flop circuit of counter circuit 5 up to which the pulse counting has advanced in a period of 1/100 sec. in response to the pulses supplied from the selected terminal, is arranged to indicate an exposure time of 1/100 sec. That is, the repetition frequency of the pulse and the time needed for the measurement of the scene illumination are suitably adjusted. Likewise, the terminal among terminals $a_o - a_n$ corresponding to the exposure multiple $x$ 1 is suitably selected. Thus, the digital indication by the indicating means, which are under control of the flip-flop circuits of storage circuit 4, is arranged to correspond to the exposure time.

The longest possible exposure time to avoid the effects of camera movement (e.g., 1/30 sec.) can be set by selecting with switch SW7 that counter-stopping pulse output terminal among terminals $b_0 - b_m$ corresponding to 1/30 sec. for manually setting that exposure time. Therefore, if the scene illumination is so inadequate under the automatic-exposure-time-setting mode of operation that an exposure time of 1/30 sec. is required then that digital indicating means among indicating means $L_o - L_l$ corresponding to 1/30 sec. will be turned "on" to indicate to the operator that a change of the diaphragm aperture is required. In the circuit illustrated in FIG. 6, indicating means $L_{1-1}$ indicates 1/30 sec. Thus the effects of camera movement can be avoided by changing the diaphragm aperture setting to alter the exposure time required for the photograph.

As is apparent from the foregoing description the system of the present invention is adapted to store data representing the scene illumination in a digital form, which data can be readily transformed into exposure time by the digital signal processing means. This ensures accurate control of the exposure time. Also, the present system permits the switching from automatic exposure time control to manual control and vice versa, with the use of a common circuitry. For the automatic exposure setting, the actual exposure time is displayed in digital form. Since the digital indicating means is not of the type such as a conventional ammeter or the like, the present system is free from mechanical breakdowns. It will also be apparent that the present system is easy to manufacture in the form of an integrated circuit device.

While switches SW1, SW2, and SW6 are assumed to be of the mechanical contact type in the foregoing description of the embodiment, they may be replaced with any switching elements such as electronic switches, gate circuits and the like. The manual adjustment for the diaphragm aperture and/or film sensitivity can be achieved by both switches SW4 and SW5 or, alternatively, only by switch SW5, in contrast to the embodiment described above.

The structures of storage circuit 4, control circuit 3, coincidence detector 6, indicator circuit 8, and light detecting circuit 2 are not restricted to the illustrated examples but various modifications within the scope of the present invention are readily apparent.

It is also understood that the reset circuit for the aforementioned storage circuit (not shown in the drawing) and the time counter are actuated in connection with the actuation of the shutter release mechanism.

What is claimed is:

1. An exposure control system for a single lens reflex camera having a shutter mechanism comprising:
   a time base unit for generating a plurality of pulse trains at respective submultiple frequencies of a basic frequency and having a plurality of first output terminals for respectively providing a pulse train at said basic frequency and each of said submultiple frequencies;
   a detecting circuit for generating an electrical signal in response to operation of a shutter release member with a delay determined in accordance with scene light;
   a first switching means for selecting one of said first output terminals;
   a second switching means for selecting one of said first output terminals;
   a storage circuit for storing pulses from said output terminal selected by said first switching means, said storage circuit including a plurality of first flip-flop circuits connected in series said storage circuit having an input terminal, and a plurality of second and third output terminals each respectively connected to corresponding outputs of each of said first flip-flop circuits;
   a pulse counter circuit for counting pulses from said output terminal selected by said second switching means;
   a control circuit including a gate circuit closed in response to the operation of a shutter release member for initiating storage of pulses within said storage circuit and opened in response to said electrical signal for terminating storage of said pulses and means for initiating operation of said pulse counter in conjunction with opening of the shutter mechanism for initiating an exposure;
   means for generating a signal to close the shutter mechanism to terminate exposure in response to the coincidence between the number of pulses in said storage circuit and said pulse counter circuit;
   means for manually setting the exposure time;
   a third switching means for selecting one of said second output terminals in conjunction with the operation of said means for manually setting the exposure; and
   a feedback circuit connected between said third switching means and said gate circuit for feeding the change of output from said manually selected second output terminal connected to the output of a corresponding one of said first flip-flop circuits to said gate circuit to open said gate circuit for terminating said storage of pulses within said storage circuit when the change of the output of said corresponding flip-flop occurs because of said storage of pulses.

2. An exposure control system as in claim 1 further comprising a fourth switching means for preventing said detecting circuit from opening said gate circuit in conjunction with the operation of said means for manually setting the exposure.

3. An exposure control system as in claim 2 wherein said fourth switching means prevents said detecting circuit from generating said electrical signal.

4. An exposure control system as in claim 1 wherein said pulse counter circuit comprises a plurality of second flip-flop circuits connected in series, said pulse counter circuit having an input terminal, said second flip-flop circuits being equal in number to said first flip-flop circuits, each of said second flip-flop circuits having fourth and fifth output terminals; and wherein said means for generating a signal includes a plurality of first AND circuits respectively connected at their respective input terminals to said second output terminals and to said fourth output terminals, a plurality of second AND circuits respectively connected at their respective input terminals to said third output terminals and to said fifth output terminals, a plurality of OR circuits respectively connected with the outputs of a respective one of said first and second AND circuits connected to said second, third, fourth and fifth output terminals of a corresponding one of said first and second flip-flop circuits, and a third AND circuit having input terminals connected with the output from said plurality of OR circuits.

5. An exposure control system as in claim 1 further comprising an indicator circuit including a plurality of fourth AND circuits each connected at one input terminal thereof to successive ones of said second output terminals and at the other input terminal thereof to said successive ones of said third output terminals, a plurality of fifth AND circuits each connected at one input terminal thereof to the output terminal of a corresponding one of said fourth AND circuits and at the other input terminal to successive ones of said third output terminals, a plurality of indicating means respectively connected to the output terminals of said fifth AND circuits whereby the exposure time is indicated in accordance with the pulses stored in said storage circuit.

* * * * *